US005803386A

United States Patent [19]

Arimoto et al.

[11] Patent Number: 5,803,386

[45] Date of Patent: Sep. 8, 1998

[54] FILM CARTRIDGE CASE

[75] Inventors: Keigo Arimoto; Masayuki Kojima; Hisashi Negoro; Takuya Yamamoto, all of Wakayama, Japan

[73] Assignee: Noritsu Koki Co., Ltd., Wakayama, Japan

[21] Appl. No.: 711,881

[22] Filed: Sep. 12, 1996

[30] Foreign Application Priority Data

| | | | |
|---|---|---|---|
| Sep. 19, 1995 | [JP] | Japan | 7-240123 |
| Oct. 13, 1995 | [JP] | Japan | 7-265711 |

[51] Int. Cl.[6] .......... G03B 1/56

[52] U.S. Cl. .......... 242/332; 242/338.4; 396/535

[58] Field of Search .......... 396/535, 538, 396/512; 242/332, 332.1, 337, 338, 338.4, 344, 348.4

[56] References Cited

U.S. PATENT DOCUMENTS

| | | | |
|---|---|---|---|
| 3,517,896 | 6/1970 | Kral | 242/337 |
| 3,526,406 | 9/1970 | Blackie et al. | 242/332 X |
| 3,667,835 | 6/1972 | Nupnau | 242/337 X |
| 3,674,347 | 7/1972 | Iha | 242/337 X |
| 3,690,751 | 9/1972 | Von Fischern et al. | 242/337 X |
| 3,753,486 | 8/1973 | Vogt et al. . | |
| 4,221,479 | 9/1980 | Harvey | 242/348.4 X |
| 4,910,546 | 3/1990 | Nonaka et al. . | |
| 5,032,854 | 7/1991 | Smart et al. | 396/512 X |
| 5,210,561 | 5/1993 | Nakai et al. . | |
| 5,296,887 | 3/1994 | Zander | 396/512 X |
| 5,463,441 | 10/1995 | Yamaguchi . | |
| 5,475,463 | 12/1995 | Yamaguchi et al. . | |
| 5,561,489 | 10/1996 | Yamaguchi et al. . | |
| 5,565,953 | 10/1996 | Fukushima et al. . | |
| 5,576,794 | 11/1996 | DeMarti, Jr. et al. . | |

FOREIGN PATENT DOCUMENTS

| | | |
|---|---|---|
| 0 421 493 | 4/1991 | European Pat. Off. . |
| 0 623 851 | 11/1994 | European Pat. Off. . |
| 0 629 916 | 12/1994 | European Pat. Off. . |
| 0 675 408 | 10/1995 | European Pat. Off. . |
| 7-281386 | 10/1995 | Japan . |

*Primary Examiner*—Donald P. Walsh
*Assistant Examiner*—William A. Rivera
*Attorney, Agent, or Firm*—Wenderoth, Lind & Ponack, L.L.P.

[57] ABSTRACT

A film cartridge case which holds and carries therein a group of film cartridges for feeding sheets of undeveloped film loaded in their respective film cartridges to the development unit of an automatic photographic film development processor apparatus includes a plurality of cartridge pockets. Each pocket has a mispositioning preventing projection provided on one side of an inner wall thereof for engaging with a barcode readout window in the film cartridge upon the film cartridge being placed in the cartridge pocket in a correct orientation. The case includes holding members for detachably holding the film cartridges in their respective cartridge pockets. A conveyor element is arranged to be engaged by a conveying device. Film sheets can be loaded to and unloaded from respective film cartridges installed in the cartridge pockets.

20 Claims, 10 Drawing Sheets

FILM CARTRIDGE CASE

BACKGROUND OF THE INVENTION

The present invention relates to an improved film cartridge case for use with a photographic film development processor machine for developing undeveloped films or more specifically, performing a series of development, fixing, drying, and other relevant processes.

The advanced photo system (APS) of a new film standard has been proposed and marketed using a film cartridge which is also unique to match the new film standard and different from the well known film cartridge.

For ease of installation in the photographic film development processor machine, a group of such new type film cartridges 90 are accommodated in a cartridge case 91 which has a tubular shape similar to that of the known film cartridge case. The film cartridges 90 are inserted one by one into the cartridge case 91 by dropping from above through an opening 92 of the case 91 (FIG. 15).

In case that the film cartridges 90 are inserted into the cartridge case 91 in a wrong orientation such as right-side wrong or upside down, their disorientation will be recognized only when the development process has started. This often happens and will delay the process.

An automatic film development processor machine as disclosed in Japanese Patent Application No. 6-75561 (1994), in which a group of film cartridges are placed in a cartridge case of a box or drum shape and when required, they are picked out one by one. This is followed by unloading a sheet of undeveloped film from its film cartridge and joining it with a film leader for guiding the undeveloped film sheet throughout the development process including development, fixing, and drying steps. After the development process is completed, the developed film sheet is loaded back to its film cartridge.

In such automatic film development processor apparatus, the film cartridges have to be picked out one at a time from the cartridge case before sheets of undeveloped film are developed and loaded back to their respective film cartridges, whereby operational efficiency will be decreased.

As the film cartridges are picked out one by one, they have to be correctly positioned for joining with the film leaders and thus require a positioning means, thus contributing to complexity of the entire arrangement and increasing the overall size of the processor machine.

This drawback is attributed not only to the automatic film development processor machine but also to a photographic printer machine.

It is an object of the present invention, in view of the above aspect, to provide a film cartridge case capable of receiving and holding a group of film cartridges in a correct orientation and without dislocation.

It is another object of the present invention to provide a film cartridge case having a simple construction to allow quick loading and unloading of photographic films to and from their respective film cartridges.

SUMMARY OF THE INVENTION

A film cartridge case, according to the present invention, which holds and carries therein a group of film cartridges for feeding sheets of undeveloped film loaded in their respective film cartridges to the development unit of an automatic photographic film development processor apparatus includes a plurality of cartridge pockets. Each pocket has a mispositioning preventing projection provided on one side of an inner wall thereof for engaging with a barcode readout window in the film cartridge upon the film cartridge being placed in the cartridge pocket in a correct orientation.

The film cartridge case may be characterized in that the cartridge pocket has a resilient holding projection provided on the other side of the inner wall thereof for fitting resiliency into the center bore of a spool of the film cartridge thus to hold the film cartridge.

The case for holding and carrying in pockets thereof a group of film cartridges is provided with holding means for detachably holding the film cartridges in their respective cartridge pockets. A conveyor element is arranged to be engaged by a cartridge conveying means. Film sheets can be loaded in and unloaded from their respective film cartridges installed in the cartridge pockets.

The holding means comprises a holding projection provided on one side of the inner wall of the cartridge pocket for pressing the film cartridge inwardly by the resiliency of the projection to detachably hold and position the same in the cartridge pocket.

The film cartridge case may be characterized in that while the film cartridge to be placed in the cartridge pocket of the film cartridge case includes a cover thereof arranged to open and close a film outlet in light shielding relationship, the cartridge pocket has an insertion aperture therein through which a cover actuator is inserted for driving the cover to be opened and closed and a through center hole therein through which a spool actuator is inserted for rotating the spool to perform the loading and unloading of the film sheet to and from its film cartridge.

The film cartridge case may be characterized in that the conveyor element comprises an engaging element for engagement with the cartridge conveying means. The case may include positioning elements for positioning the cartridge pockets of the cartridge case. The positioning of the cartridge pockets may be determined by detection of detector elements provided in the film cartridge case.

Also, the film cartridge case may further comprise supporting flanges provided on opposite side edges thereof.

DETAILED DESCRIPTION OF THE PREFERRED EMBODIMENTS

Embodiment 1

A first embodiment of the present invention is illustrated in FIGS. 1 to 8.

Figure 1:
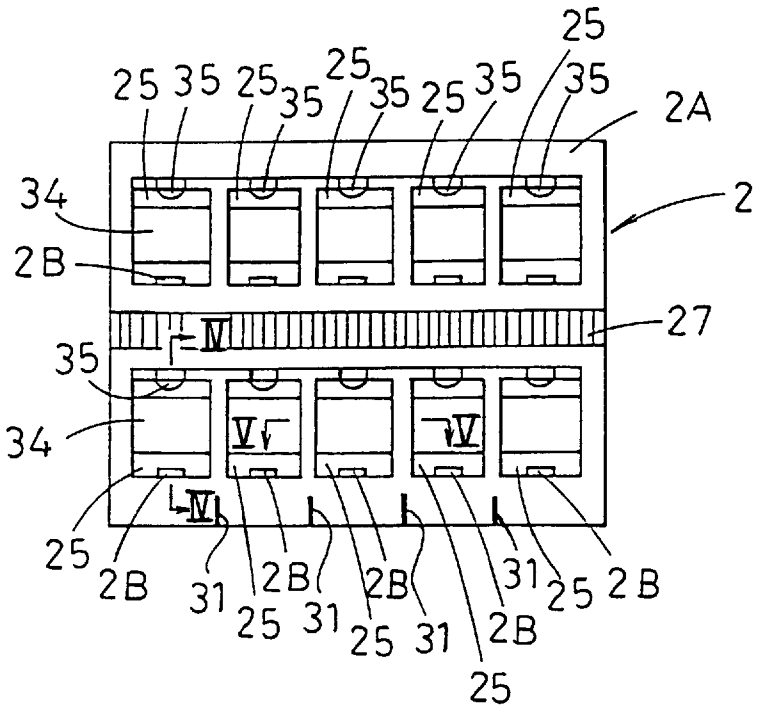
FIG. 1 is a plan view of a film cartridge case according to the present invention.
Figure 2:
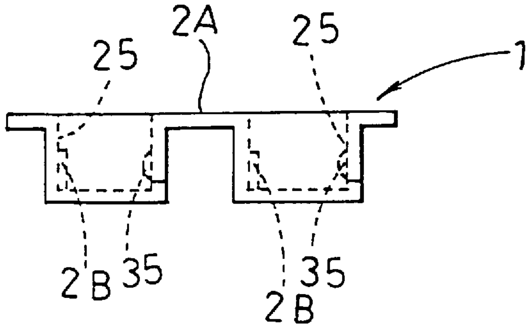
FIG. 2 is a front view of the film cartridge case.

A film cartridge case 2 of this embodiment is designed for carrying therein a group of film cartridges 3 loaded with undeveloped films to continuously feed a development unit 10 of an automatic film development processor machine 1 (FIG. 6) and, as shown in FIGS. 1 and 2, includes a rack (conveyed means) 27 provided on a center of a case body 2A thereof and two rows of cartridge pockets 25 (each row having five pockets in the illustrated embodiment) located on opposite, left and right, sides of the rack 27.

A number of sensor slits 31 are provided in one side edge of the case body 2A of the cartridge case 2 corresponding to the row of the cartridge pockets 25.

Figure 3:
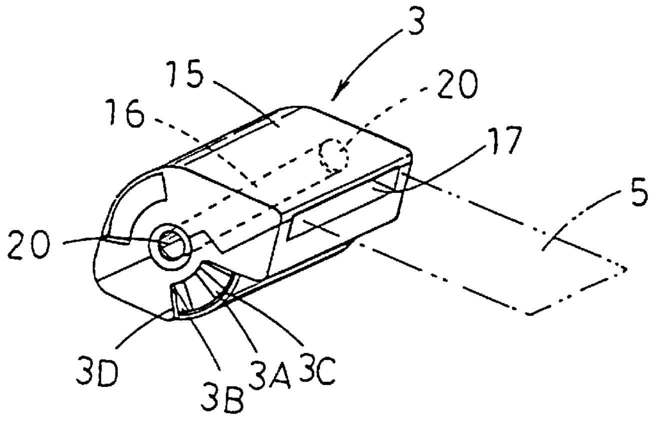
FIG. 3 is a perspective view of a film cartridge.

A film cartridge 3 of a type shown in FIG. 3 will now be explained.

The film cartridge 3 includes a spool 16 rotatably mounted in a casing 15 thereof and a film outlet 17 provided therein for loading and unloading a sheet of film 5 on the spool 16.

A disk 3B is mounted to one end of the spool 16 and has a barcode 3A printed thereon. The other end of the spool 16 is arranged for connection with a spool rotating shaft (not shown) mounted in the automatic film development processor machine and actuated by the same for loading and unloading of the film sheet 5.

The casing 15 has two center holes 20 provided in opposite sides thereof and a barcode readout window 3C provided in one of the two sides thereof.

More specifically, the barcode readout window 3C is a notch in the outer edge of one side of the casing 15 which defines a step 3D around window 3C.

The barcode 3A represents an ISO number of sensitivity and can be read by an optical reader (not shown) while the disk 3B is being rotated with the spool 16.

The cartridge pocket 25 of a film cartridge case 2 will be explained in more detail.

Figure 4:
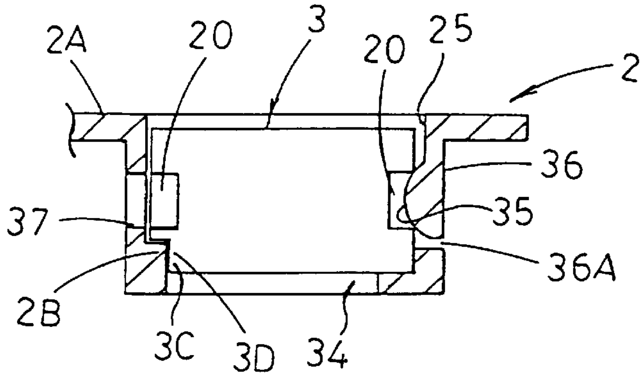
FIG. 4 is a cross sectional view taken along the line IV—IV of FIG. 1.
Figure 5:
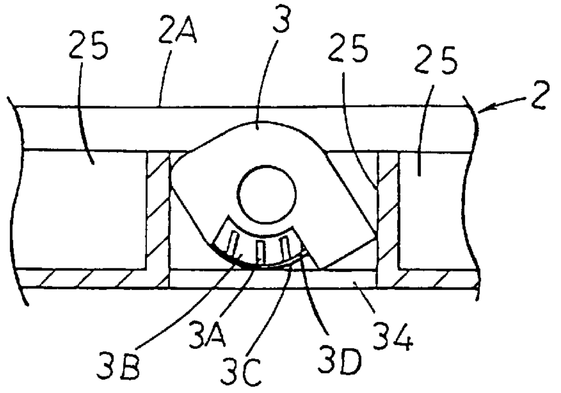
FIG. 5 is a cross sectional view taken along the line V—V of FIG. 1.

As shown in FIGS. 4 and 5, the cartridge pocket 25 is designed for holding a film cartridge 3 in a correct orientation and allowing a sheet of film 5 to be loaded and unloaded therefrom.

The cartridge pocket 25 has a mispositioning preventing projection 2B provided on a lower region of an inner side wall thereof for engaging with the step 3D about the barcode readout window 3C of the film cartridge 3 when the cartridge 3 being placed in its correct orientation.

Also, a spool actuator insertion aperture 37 is provided in the side wall of the cartridge pocket 25 for accepting a spool actuator shaft.

The cartridge pocket 25 has a through hole 34 in the bottom thereof for passing the film sheet 5 to be loaded or unloaded.

Figure 7:
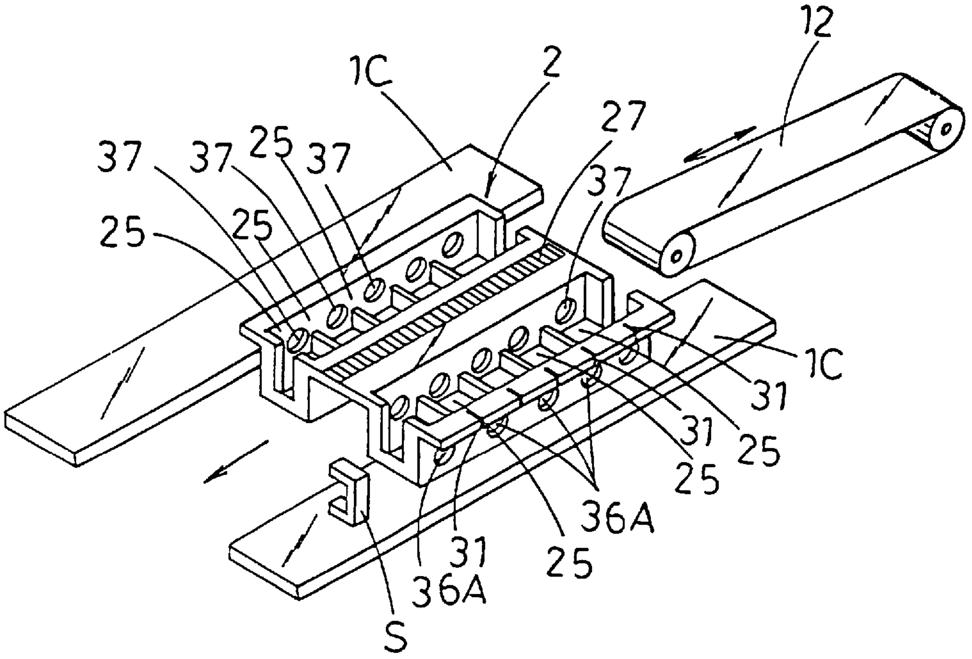
FIG. 7 is a perspective view showing the cartridge case being conveyed.

Provided on the other side wall of the cartridge pocket 25 is a semicircular holding projection 35 which is to be fitted into one center hole 20 of the film cartridge 3 thus to hold the same. More particularly, the holding projection 35 is formed on the distal end of a holding means 36 which is defined by making a U-shaped slit 36A in the other side wall of the cartridge pocket 25 (FIGS. 4 and 7). When the film cartridge 3 is placed in the cartridge pocket 25 in its correct orientation, its step 3D about the barcode readout window 3C comes in engagement with the mispositioning preventing projection 2B.

If the film cartridge 3 is inserted in a wrong orientation, its placement is disabled by the mispositioning preventing projection 2B.

As the film cartridge 3 is inserted into the cartridge pocket 25, it urges outwardly the holding means 36. When the film cartridge 3 has been seated, the holding means 36 is resiliently returned back and fitted with its holding projection 35 into the center hole 20 of the film cartridge 3 for securing the cartridge 3.

Figure 6:
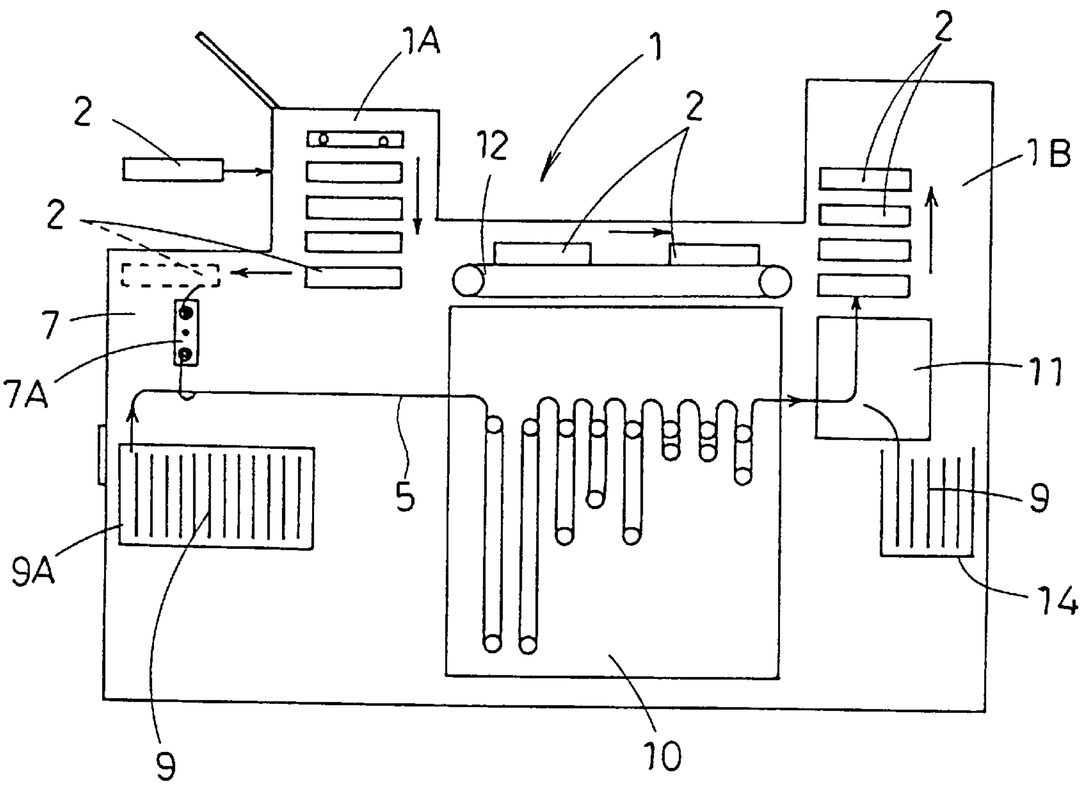
FIG. 6 is a schematic view of a film development processor machine.

FIG. 6 is a schematic side view of an automatic film development processor machine 1 which comprises a development unit 10 including a developer tank, a film leader feeder unit 9A for feeding film leaders 9, a separator unit 11 for separating the film leaders 9 from sheets of developed film, a film leader stocker unit 14 for receiving and storing the film leaders 9, a cartridge case feeder unit 1A for feeding one by one the film cartridge cases 2 filled with the film cartridges 3, a cartridge stocker unit 1B for receiving and storing the cartridge cases 2, a conveyor belt 12 for conveying the film unloaded cartridge case 2 from the cartridge feeder unit 1A to the cartridge stocker unit 1B, and a film rewinding station 7.

Figure 8:
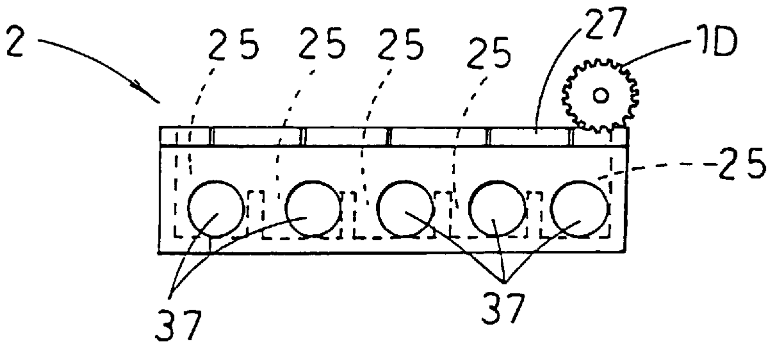
FIG. 8 is a side view of the cartridge case being conveyed.

The film rewinding station 7 is arranged, as shown in FIGS. 7 and 8, such that a the film cartridge case 2 is placed on a pair of left and right rails 1C and advanced in a direction denoted by the arrow with its rack 27 engaged and driven by a drive gear 1D, and upon each of the sensor slits 31 of the film cartridge case 2 being detected by a sensor S, its corresponding cartridge pocket 25 stops just above a film takeup means 7A of the rewinding station 7 (FIG. 6). This is followed by unloading the sheet of undeveloped film 5 from its cartridge 3 with a film unloading means and rewinding it in the takeup means 7A.

The film unloading means is designed for inserting its spool actuator shaft (not shown) through the spool actuator hole 37 of the cartridge pocket 25 to engage with and rotate the end of the spool 16 of the film cartridge 3 for unloading the undeveloped film sheet 5.

A series of operations for developing the undeveloped film sheets 5 unloaded from their respective cartridges 3 installed in the corresponding cartridge pockets 25 of the film cartridge case 2 in the automatic film development processor machine will now be described.

(1) The film cartridge case 2 is set in the cartridge feeder unit 1A.

(2) The film cartridge case 2 is lowered down so that its rack 27 comes in engagement with the drive gear 1D.

(3) The first of the cartridge pockets 25 of the cartridge case 2 is advanced to just above the film takeup means 7A, and a sheet of undeveloped film 5 is unloaded from its film cartridge 3 in the first cartridge pocket 25 and rewound into the film takeup means 7A.

(4) When the film takeup means 7A has been loaded with the undeveloped film sheet 5, it is turned upside down. The undeveloped film sheet 5 is drawn out from the takeup means 7A in an opposite direction and spliced with a film leader 9 before being transferred to the development unit 10 for development, bleaching, fixing, drying, and other relevant processes.

(5) While the undeveloped film sheet 5 is being spliced with the film leader 9, the second of the cartridge pockets 25 of the cartridge case 2 is advanced to just above the film takeup means 7A and the same operation is repeated.

(6) After all undeveloped film sheets 5 are drawn out from their respective film cartridges 3, the drive gear 1D is driven in a reverse direction to deliver the film cartridge case 2 filled with the film unloaded cartridges 3 to the conveyor belt 12 which in turn conveys the film cartridge case 2 to the stocker unit 1B.

(7) When the film sheet 5 has been developed, it is separated from the film leader 9 in the separator unit 11 and transferred to the stocker unit 1B where it is identified by with its ID number and loaded back to its film cartridge 3 bearing the ID number by the loading means (not shown).

Simultaneously, the film leader 9 separated from the developed film sheet 5 is received by the leader stocker unit 14.

(8) As all the developed film sheets 5 have been loaded back to their respective film cartridges 3 installed in the film cartridge case 2, the cartridge case 2 is lifted and stored in the stocker unit 1B.

Embodiment 2

FIGS. 9 to 14 show a second embodiment of the present invention.

Figure 9:
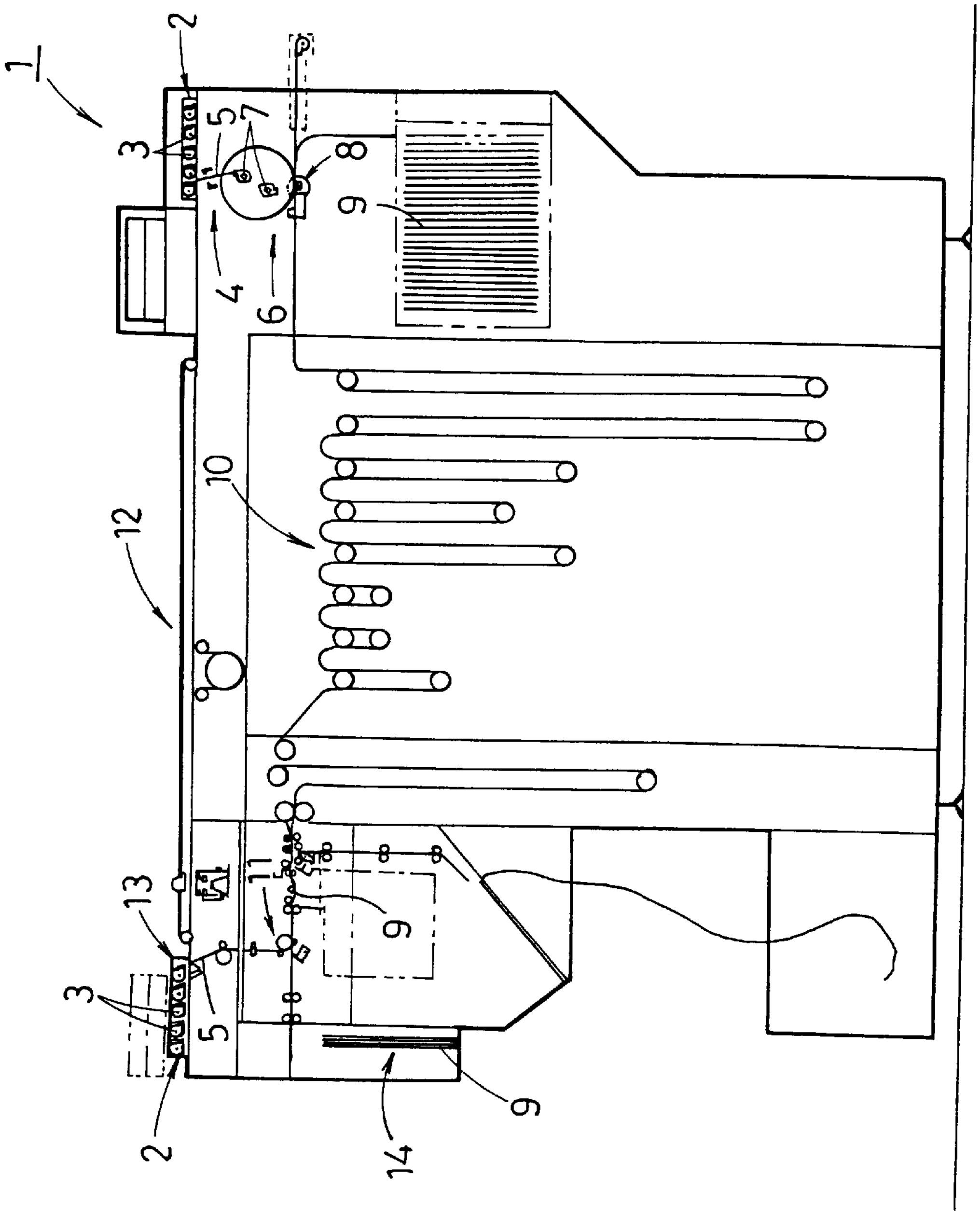
FIG. 9 is a schematic side view of an automatic film development processor machine.

FIG. 9 is a schematic view of a film development processor apparatus denoted by the numeral 1.

Also shown are a film cartridge case 2 for carrying therein a group of film cartridges 3 loaded with undeveloped films, an unloading station 4 where a sheet of undeveloped film 5 is unloaded from its film cartridge 3 installed in the film cartridge case 2, and a rewinding unit 6 for rewinding the undeveloped film sheet 5 into a takeup cartridge 7.

There are provided a splicer unit 8 for joining the exposed end of the undeveloped film sheet 5 from the takeup cartridge 7 with a film leader 9 for further transferring, a developer unit 10 for developing the undeveloped film sheet 5 headed with the film leader 9, a separator unit 11 for separating the developed film sheet 5 from the film leader 9, a film unloaded cartridge conveyor unit 12 for conveying the film unloaded cartridge case 2 from which the undeveloped film sheets 5 have been unloaded at the unloading station 4, a loading station 13 where developed film sheets 5 are loaded into the cartridges 3 in the film unloaded cartridge case 2, and a leader receiver unit 14 for receiving and storing a group of the film leaders 9 separated from their respective developed film sheets 5 at the separator unit 11.

Figure 10:
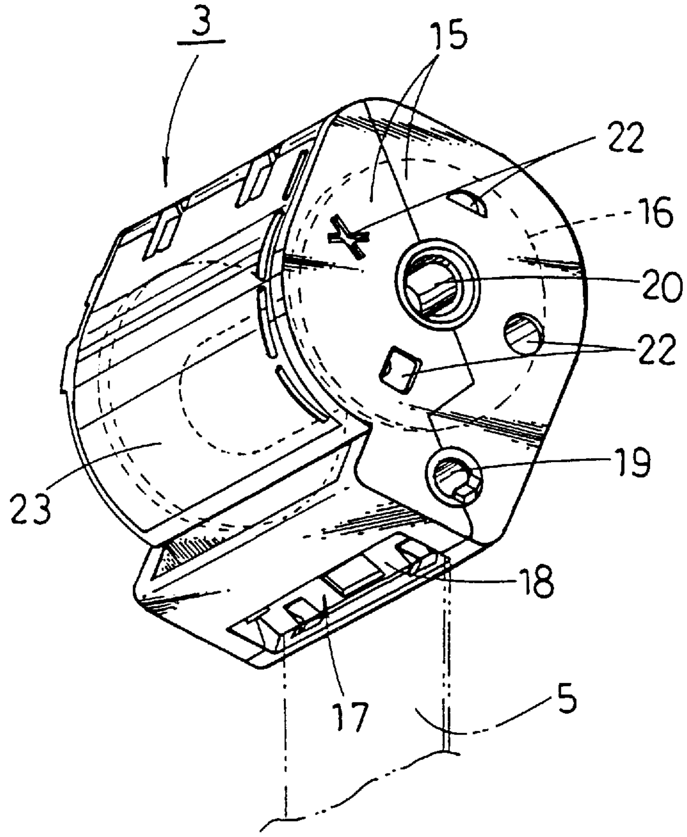
FIG. 10 is a perspective view of a film cartridge to be carried in a cartridge case for the automatic film development processor machine.

The film cartridge 3 to be held in the cartridge case 2 includes, as shown in FIG. 10, a casing 15 consisting of two separated synthetic resin members, a spool 16 rotatably mounted in the casing 15, and a cover 18 for closing a film outlet 17 to shield the casing interior from external light. The cover 18 is actuated for opening and closing operations by a pivotal (operating) shaft 19 which is mounted through a side wall of the casing 15 to be driven by an opening and closing mechanism (not shown). When the cover 18 is opened, the spool 16 is rotated with one (operating) end 20 engaged across the side wall of the casing 15 and driven by a rotating mechanism (not shown) for loading and unloading the film 5.

The casing 15 of the cartridge 3 has an ID bearing region 23 on the outer surface thereof for indicating an identification number of the cartridge 3. Also, a display window 22 is provided in the side wall of the casing 15 where the operating end 20 of the spool 15 is exposed and for displaying either an unused or a used condition of the cartridge 3, a state of development, the presence or absence of available frames, etc.

The cartridge case 2 for holding a group of the film cartridges 3 is illustrated in more detail in FIGS. 11 to 14.

The cartridge case 2 holds and carries the film cartridges 3 from the unloading station 4 to the loading station 13 and comprises two, left and right, rows of cartridge pockets 25, five pockets in each row, extending along opposite sides of a link or connecting plate 26 and in a moving direction W. The cartridge pocket 25 has a bottom 24 thereof tailored to match the shape of the film cartridge 3 shown in FIG. 10.

A rack or conveyor element 27 for engagement with a cartridge conveying means described later (not shown in FIGS. 11 to 14) is provided on one side of each row of the cartridge pockets 25.

Figure 11:
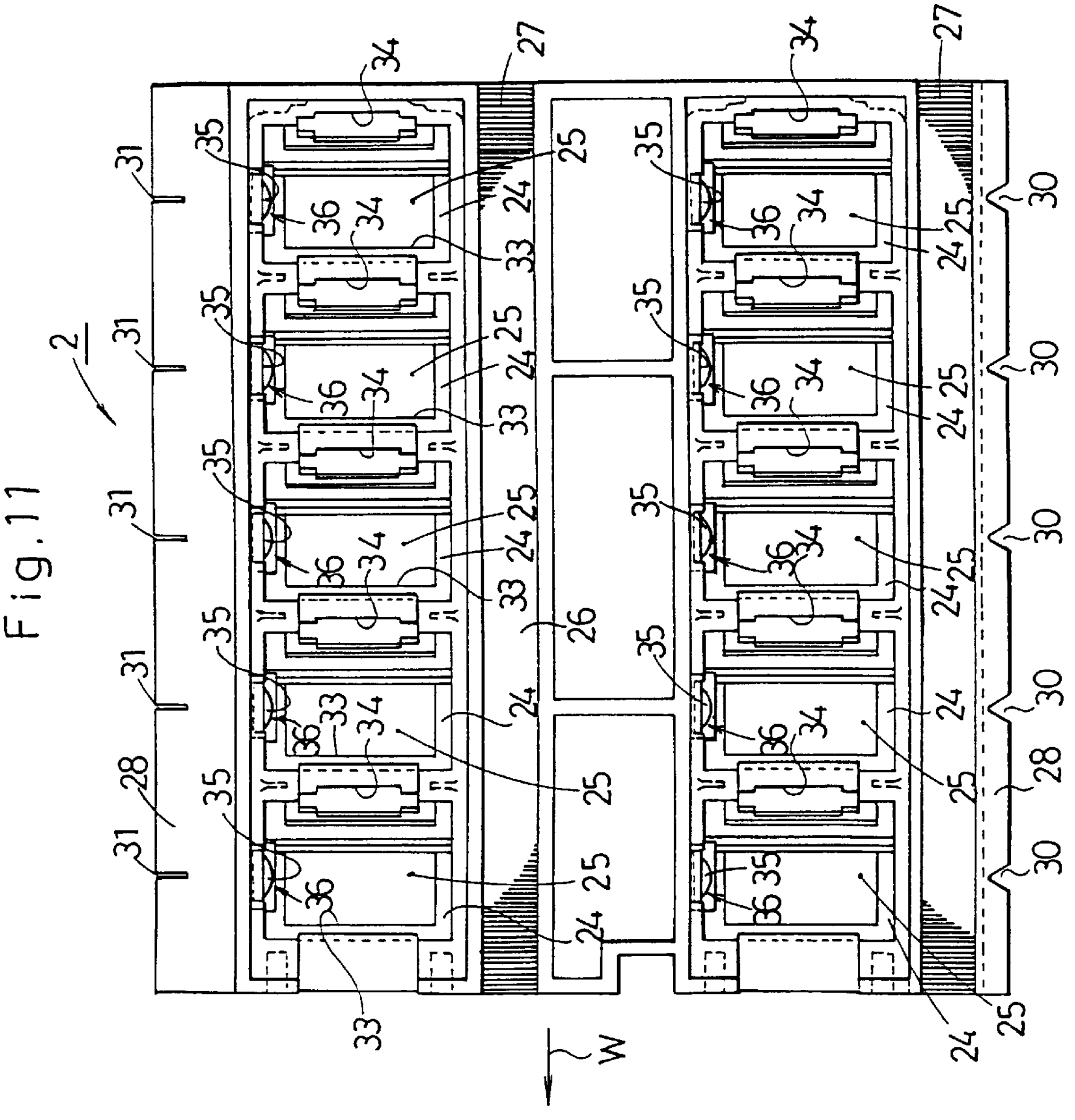
FIG. 11 is a plan view of the cartridge case.

Also, two flanges 28 are provided on both outer sides of the rows of the cartridge pockets 25, extending in the moving direction W of the cartridge case 2. Referring to FIG. 11, one of the two flanges 28 on the left of the moving direction W of the cartridge case 2 has a plurality of V-shaped (positioning) notches 30 provided in an outer edge thereof for positioning the cartridge case 2 in relation to each cartridge pocket 25. The other flange 28 has a plurality of slit detection elements 31 provided in an outer edge thereof for use to indicate the cartridge case 2 being positioned in relation to a target cartridge pocket 25.

Figure 12:
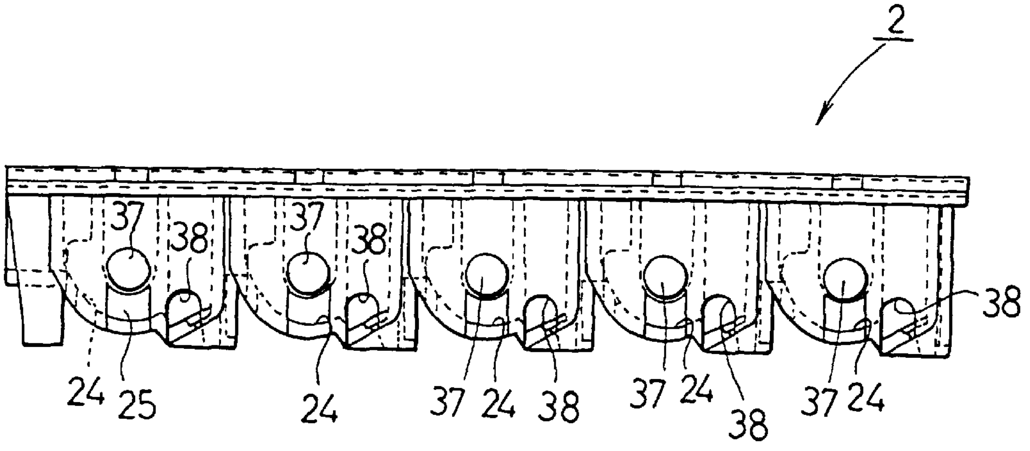
FIG. 12 is a side view of the cartridge case.
Figure 13:
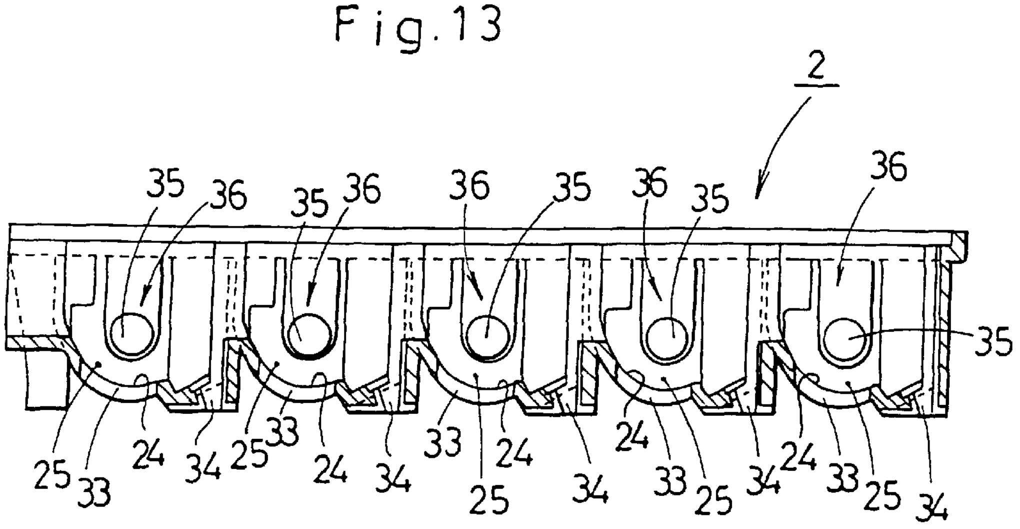
FIG. 13 is a cross sectional view of cartridge pockets of the cartridge case.
Figure 14:
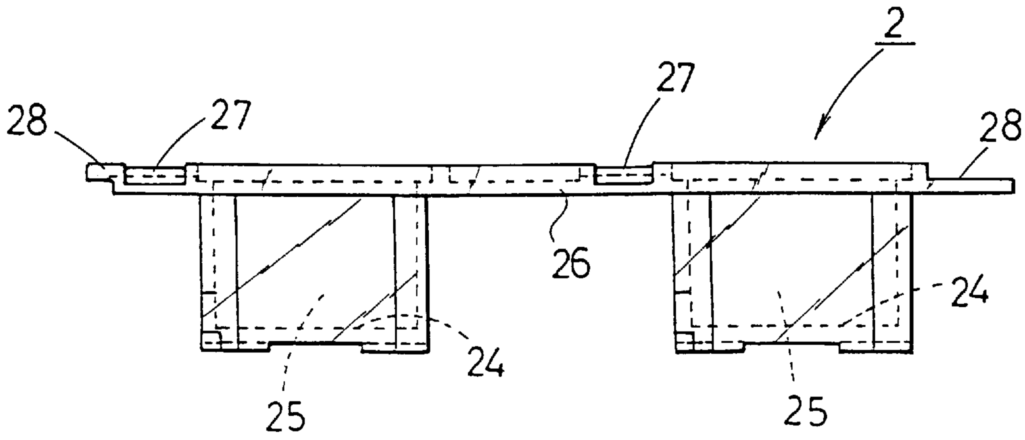
FIG. 14 is a front view of the cartridge case.
Figure 15:
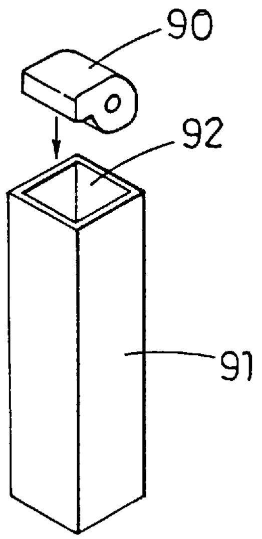
PRIOR ART Fig. 15
FIG. 15 is a perspective view of a prior art arrangement.

Each of the bottoms 24 of the cartridge pockets 25 which are aligned in two rows between the flanges 28 at a level lower than the transfer elements 27 has a readout window 33 for viewing the ID bearing region 23 of the film cartridge 3 held in the pocket 25 and a through aperture 34 for passing the film sheet 5 unloaded from or loaded into its cartridge 3 through the film outlet 17. Also, the bottom 24 of the cartridge pocket 25 is provided at one side with a vertically extending holddown means 36 for pressing down with a lower semicircular projecting portion 35 thereof the casing 15 of the film cartridge 3 thus to hold the cartridge 3 in a correct orientation, and at the other side with a spool actuating hole 37 through which the operating end 20 of the spool 16 in the cartridge 3 is engaged with and actuated by the rotating mechanism for loading and unloading the film 5 and a cover actuating hole 38 through which the pivotal shaft 19 of the cover 18 is actuated by the not shown mechanism for opening and closing the film outlet 17 of the cartridge 3 (FIGS. 12 and 13).

For starting the operation of the film development processor apparatus, a desired number of the film cartridges 3 loaded with undeveloped films 5 are installed by an operator in the cartridge pockets 25 of each cartridge case 2.

When two rows of the film cartridges 3 are correctly placed in the cartridge pockets 25 of the cartridge case 2 and secured with the respective holddown portions 35, the operating end 20 of each spool 16 is aligned with the spool actuating hole 37 of the cartridge pocket 25, the film outlet 17 is aligned with the through aperture 34, and the pivotal shaft 19 of each cover 18 is aligned with the cover actuating hole 38. Simultaneously, the ID bearing region 23 of each cartridge 3 is located and viewed through the readout window 33.

The film cartridges 3 in the cartridge case 2 are delivered in succession by a not shown transfer mechanism to the rewinding station 6 where each undeveloped film sheet 5 is transferred from its film cartridge 3 to the takeup cartridge 7.

While the cartridge case 2 is positioned in the unloading station 4, the V-shaped notches 30 of one flange 28 come into engagement with correspondingly shaped projections provided on the rewinding station 6 (not shown) and the slit detection elements 31 of its other flange 28 are detected. In response to the detection of the slit detection elements 31, the cover 18 of the film outlet 17 of a cartridge 3 is opened by the cover actuating mechanism coupling across the through hole 38 and turning the pivotal shaft 19. Also, the spool 16 is rotated as its operating end 20 is engaged through the spool actuating hole 37 with the spool actuating mechanism so that the undeveloped film sheet 5 is unloaded from its cartridge 3.

The undeveloped film sheet 5 is then rewound into the takeup cartridge 7 when its trailing end has been detached from the spool 16 of the cartridge 3 by an automatic detaching device not shown. During such the rewinding, the ID bearing region 23 of the cartridge 3 is read and recorded on a controller (not shown) and the trailing end of the undeveloped film sheet 5 is read by a recording means such as a magnetic head.

When the undeveloped film sheet 5 unloaded from the cartridge 3 has been rewound, the V-shaped notches 30 of the cartridge case 2 are disengaged from the corresponding projections. This is followed by advancing the cartridge case 2 one step so that the succeeding film cartridge 3 comes to the unloading station 4. The undeveloped film sheets 5 of all the film cartridges 3 in the cartridge case 2 are unloaded and rewound in a succession by repeating the above procedure.

The trailing end of the undeveloped film sheet 5 rewound in the takeup cartridge 7 is joined to the film leader 9 by the splicer unit 8 and then drawn out from the takeup cartridge 7 while being guided by the film leader 9. The undeveloped film sheet 5 is then subjected to the development, bleaching, fixing, drying, and other known processes, and is separated from its film leader 9 by the separator unit 11.

While the undeveloped film sheet 5 from the takeup cartridge 7 is being developed, fixed, and dried in the development unit 10, the succeeding undeveloped film sheets 5 are unloaded from the remaining film cartridges 3 and rewound in succession into the takeup cartridges 7. The film unloaded cartridges 3 in the film cartridge case 2 are then conveyed by the unloaded cartridge conveyor unit 12 to the loading station 13.

At the loading station 13, the film cartridge case 2 is positioned with the V-shaped notches 30 of its flange 28 engaged with corresponding projections of the loading station 13. The positioning of the cartridge case 2 is detected as the slit detection elements 31 of its other flange 28 are read. This is followed by actuating the pivotal shaft 19 for turning the cover 18 to open the film outlet 17 of the film cartridge 3 with the cover actuator inserted through the through aperture 38. The developed film sheet 5 is then identified by comparing its ID record with the ID data of the ID bearing region 23 on the film cartridge 3, and is loaded back with its end (i.e. the trailing end of the undeveloped film form) through the film outlet 17 onto the spool 16 of the film cartridge 3.

The operating end 20 of the spool 16 is then linked across the spool actuating hole 37 and rotated by the spool actuating mechanism for taking up the developed film sheet 5 in its cartridge 3.

When the film cartridge 3 in the cartridge case 2 has been loaded again with its developed film sheet 5, its V-shaped notches 30 are disengaged from the corresponding projections to move the succeeding film cartridge 3 to the loading station 13. By repeating this procedure, all the film cartridges 3 in the film cartridge case 2 are loaded with their respective developed film sheets 5.

The film cartridges 3 loaded with their respective developed film sheets 5 are then picked out from the film cartridge case 2 as their casings 15 easily can be detached from the corresponding holding projections 35 of the cartridge pockets 25.

Accordingly, once the film cartridges 3 have been installed in the cartridge case 2, their undeveloped film sheets 5 are automatically unloaded, developed, and loaded again in the film development processor apparatus.

The film cartridge case of the present invention is not limited to use with a film development processor machine but may also be applicable to a photographic printing apparatus or a cartridge stocker apparatus.

What is claimed is:

1. A film cartridge case for holding and storing therein a plurality of film cartridges each having therein a barcode readout window, for use in an automatic film development processor apparatus, whereby undeveloped film sheets may be unloaded from the film cartridges, developed in a development unit of the automatic film development processor apparatus, and then reloaded back to the film cartridges, said case comprising:

a plurality of pockets for receipt of respective film cartridges; and each said pocket having an inner wall having on one side thereof a mispositioning preventing projection operable to engage the barcode readout window of a respective film cartridge when in a correct orientation and to prevent receipt of the film cartridge when in an incorrect orientation, and each said pocket having on another side of said inner wall thereof a resilient holding projection operable to fit into a center bore of a spool of the respective film cartridge and to resiliently hold the same in said pocket.

2. A case as claimed in claim 1, wherein said plurality of pockets are arranged in at least one row.

3. A case as claimed in claim 2, wherein said plurality of pockets are arranged in two parallel rows.

4. A case as claimed in claim 3, further comprising a conveyor element located between said rows and operable to be engaged with a conveyor means to enable said case to be conveyed.

5. A case as claimed in claim 1, further comprising a conveyor element operable to be engaged with a conveyor means to enable said case to be conveyed.

6. A case as claimed in claim 1, further comprising flanges extending from opposite sides of said case.

7. A case as claimed in claim 6, further comprising positioning elements provided at one said flange at positions corresponding to respective said pockets to enable relative positioning of said case.

8. A case as claimed in claim 7, further comprising position detection elements provided at the other said flange at positions corresponding to respective said flanges to enable relative positioning of said case to be detected.

9. A case as claimed in claim 6, further comprising position detection elements provided at one said flange at positions corresponding to respective said flanges to enable relative positioning of said case to be detected.

10. A case as claimed in claim 1, wherein each said pocket has an insertion aperture for receipt of a cover actuator for opening a cover covering a film outlet of the respective film cartridge, and a through center hole for receipt of a spool actuator for rotating a spool of the respective film cartridge.

11. A film cartridge case for holding and carrying a plurality of film cartridges loaded with undeveloped film sheets, said case comprising:

a plurality of pockets for receipt of respective film cartridges;

each said pocket having holding means for detachably holding therein a respective film cartridge received therein, said holding means comprising, on one side of an inner wall of said each pocket, a resilient holding projection operable to fit into a center bore of a spool of the respective film cartridge to resiliently press and detachably hold and position the respective film cartridge within said each pocket;

each said pocket having means to enable a film sheet of the respective film cartridge to be unloaded therefrom and to be loaded thereto while the respective film cartridge is received in said each pocket; and a conveyor element operable to enable said case to be conveyed.

12. A case as claimed in claim 11, wherein said plurality of pockets are arranged in at least one row.

13. A case as claimed in claim 12, wherein said plurality of pockets are arranged in two parallel rows.

14. A case as claimed in claim 13, wherein said conveyor element located between said rows and operable to be engaged with a conveyor means to enable said case to be conveyed.

15. A case as claimed in claim 11, wherein said conveyor element operable to be engaged with a conveyor means to enable said case to be conveyed.

16. A case as claimed in claim 11, further comprising flanges extending from opposite sides of said case.

17. A case as claimed in claim 16, further comprising positioning elements provided at one said flange at positions corresponding to respective said pockets to enable relative positioning of said case.

18. A case as claimed in claim 17, further comprising position detection elements provided at the other said flange at positions corresponding to respective said flanges to enable relative positioning of said case to be detected.

19. A case as claimed in claim 16, further comprising position detection elements provided at one said flange at positions corresponding to respective said flanges to enable relative positioning of said case to be detected.

20. A case as claimed in claim 11, wherein said unloading and loading enabling means comprises an insertion aperture for receipt of a cover actuator for opening a cover covering a film outlet of the respective film cartridge, and a through center hole for receipt of a spool actuator for rotating a spool of the respective film cartridge.

* * * * *